(12) United States Patent
Wu

(10) Patent No.: US 12,480,485 B2
(45) Date of Patent: Nov. 25, 2025

(54) MULTIFUNCTIONAL INFLATION PUMP

(71) Applicant: Xuehua Wu, Shenzhen (CN)

(72) Inventor: Xuehua Wu, Shenzhen (CN)

( * ) Notice: Subject to any disclaimer, the term of this patent is extended or adjusted under 35 U.S.C. 154(b) by 0 days.

(21) Appl. No.: 18/618,625

(22) Filed: Mar. 27, 2024

(65) Prior Publication Data

US 2025/0101973 A1 Mar. 27, 2025

(30) Foreign Application Priority Data

Sep. 21, 2023 (CN) .......................... 202322574279.1

(51) Int. Cl.
*F04B 39/12* (2006.01)
*F04B 35/04* (2006.01)
*F04B 49/06* (2006.01)
*H02J 7/00* (2006.01)

(52) U.S. Cl.
CPC ............ *F04B 39/121* (2013.01); *F04B 49/06* (2013.01); *H02J 7/00* (2013.01); *F04B 35/04* (2013.01)

(58) Field of Classification Search
CPC ........ F04B 35/04; F04B 35/06; F04B 39/121; F04B 49/06; H02J 7/00
See application file for complete search history.

(56) References Cited

U.S. PATENT DOCUMENTS

2019/0183099 A1* 6/2019 Lin ................ F04D 13/068

FOREIGN PATENT DOCUMENTS

| CN | 206234086 U | | 6/2017 |
| CN | 111779652 A | * | 10/2020 |
| CN | 212479498 U | * | 2/2021 |
| CN | 216665865 U | | 6/2022 |

* cited by examiner

*Primary Examiner* — Audrey B. Walter

(57) ABSTRACT

A multifunctional inflation pump is disclosed, which includes a housing body. A lower housing is fixedly connected inside the housing body, an air compressor core is fixedly installed inside the lower housing, an upper housing is fixedly connected to a top of the lower housing, a line board is fixedly connected to a bottom of the upper housing, a protective housing is fixedly connected to a top of the upper housing, a key is fixedly connected to one side of the top of the upper housing located on the protective housing. It can provide power to the air compressor core through the battery assembly set inside the housing body. By setting a detachable battery, the battery can be easily exited as a daily mobile power source. Through the deflation component set on one side of the housing body, the device comes with an automatic deflation function by one button.

7 Claims, 7 Drawing Sheets

MULTIFUNCTIONAL INFLATION PUMP

CROSS REFERENCE TO RELATED APPLICATIONS

This application claims foreign priority of Chinese Patent Application No. 202322574279. 1, filed on Sep. 21, 2023 in the China National Intellectual Property Administration, the disclosures of all of which are hereby incorporated by reference.

TECHNICAL FIELD

The present disclosure relates to the field of inflation pump technology, specifically to a multifunctional inflation pump.

BACKGROUND ART

With the rapid development of the Chinese economy, people's income is also increasing day by day. The purchase of electric vehicles and small cars has become a popular choice, and people often experience insufficient tire pressure while driving cars.
When the car tire pressure is insufficient, people need to inflate the car tire in time, and people will use the inflation pump when inflating the car tire. The inflation pump is an automatic inflation tool that operates through an electric motor, also known as an inflator, air pump, or inflation machine. Due to its fast and automatic inflation effect, the inflation pump is commonly applied to vehicle tires, rubber balls, rubber boats, and outdoor inflatable equipment.

However, the existing inflation pump has a relatively simple structure and a single function. When the inflation pump is used outdoors, it is necessary to connect the power supply through the power cord. When inflating equipment such as car tires, inflatable beds, and inflatable sofas outdoors, it also needs to rely on the car power supply as the power supply foundation, which causes inconvenience to users. Moreover, the inflation pump can only be used for inflation, and its function is relatively single, which cannot meet the outdoor activity needs of users, resulting in low practicality of the inflation pump.

In order to solve the above problems, a multifunctional inflation pump is proposed in this disclosure.

SUMMARY

In response to the shortcomings of prior art, the present disclosure provides a multifunctional inflation pump to at least solve one of the problems proposed in the background art, making the use of the inflation pump more convenient.

To achieve the above objectives, the present disclosure provides the following technical solution: a multifunctional inflation pump includes a housing body, wherein a lower housing is fixedly connected inside the housing body, an air compressor core is fixedly installed inside the lower housing, an upper housing is fixedly connected to a top of the lower housing, a line board is fixedly connected to a bottom of the upper housing, a protective housing is fixedly connected to a top of the upper housing, a key is fixedly connected to one side of the top of the upper housing located on the protective housing, a keyboard frame is fixedly connected to the key, a keyboard decorative piece is fixedly connected to the keyboard frame, a battery assembly is provided on one side of an interior of the housing body located at the lower housing, and a deflation assembly is provided on the other side.

Preferably, the battery assembly includes a tail component fixedly connected to the interior of the housing body located at the lower housing, a connector fixedly connected between the tail component and the lower housing, a spring pressure piece fixedly connected to a top of the connector, a spring fixedly connected to a top of the spring pressure piece, a hook fixedly connected to an upper end of the spring, a button fixedly connected to a top of the hook, a symmetrical deflation decorative piece fixedly connected to a bottom of one side of the tail component, a battery box fixedly connected inside the tail component, a battery holder slidably connected inside the battery box, a lithium battery installed inside the battery holder, a circuit board fixedly connected to a top of the battery holder, a battery copper pin buckle base fixedly connected to one side of the battery holder, a protective component connected to one side of the battery copper pin buckle base, and a battery cover fixedly connected to one side of the battery holder. One side of the hook runs through the tail component and the battery cover, and is clamped with the battery cover.

Preferably, the deflation assembly includes a head cover fixedly connected to one side of the housing body, an air outlet grille fixedly connected to the head cover, a light frame fixedly connected to an inner wall of the head cover, a light plate fixedly connected to one side of the light frame, a heat dissipation component fixedly connected to one side of the light plate, an insertion rod fixedly connected to a top of the air compressor core, and a deflation button fixedly connected to an upper end of the insertion rod.

Preferably, through holes are provided on both sides of the housing body, and an air intake grille is fixedly installed inside the through hole.

Preferably, a top of the deflation button is fixedly connected with a button patch.

Preferably, the protective component is fixedly connected to the battery copper pin buckle base through a copper pin buckle.

Preferably, the lower housing and the upper housing are both made of ABS material.

Compared with the prior art, the present disclosure has the following beneficial effects:

This multifunctional inflation pump can provide power to the air compressor core through the battery assembly set inside the housing body during use, so that it inflates equipment such as car tires, inflatable beds, and inflatable sofas without the need for an external power supply, making the use of the device more convenient. Moreover, by setting a detachable battery, the battery can be easily exited as a daily mobile power source, effectively improving the practicality of the device during use. Through the deflation component set on one side of the housing body, the device comes with an automatic deflation function by one button during use, thereby further improving the practicability of the device.

DESCRIPTION OF THE ACCOMPANYING DRAWINGS

Figure 1:
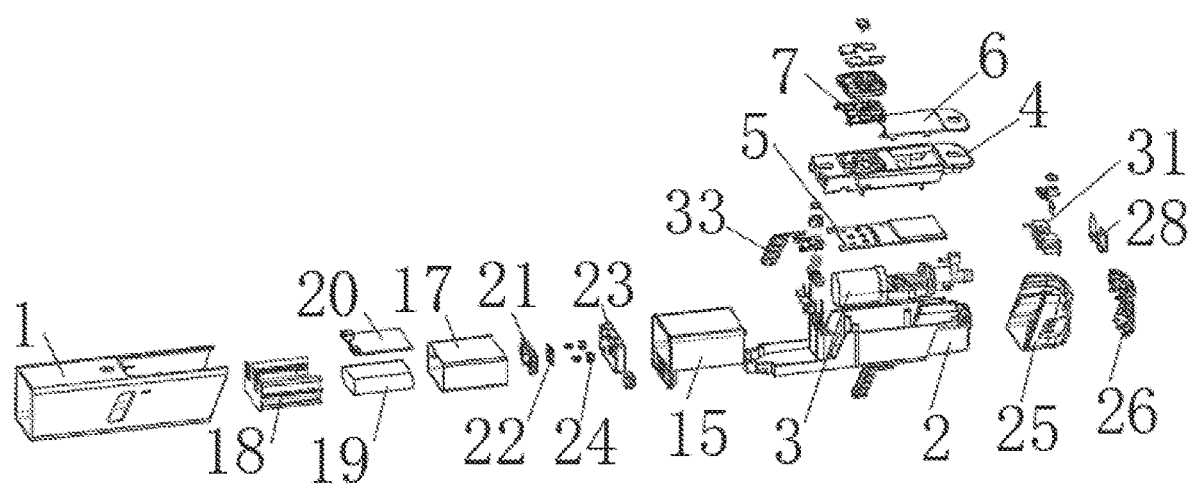
FIG. 1 is a schematic diagram of the overall explosive structure of the present disclosure.

In the figures: 1. Housing body; 2. Lower housing; 3. Air compressor core; 4. Upper housing; 5. Line board; 6. Protective housing; 7. Key; 8. Keyboard frame; 9. Keyboard decorative piece; 10. Connector; 11. Spring pressure piece; 12. Hook; 13. Spring; 14. Button; 15. Tail component; 16. Deflation decorative piece; 17. Battery box; 18. Battery holder; 19. Lithium battery; 20. Circuit board; 21. Battery copper pin buckle base; 22. Protective component; 23. Battery cover; 24. Copper pin buckle; 25. Head cover; 26. Air outlet grille; 27. Light frame; 28. Light plate; 29. Heat dissipation component; 30. Insertion rod; 31. Deflation button; 32. Button patch; 33. Air intake grille; 34. Through hole.

DETAILED DESCRIPTION OF THE EMBODIMENTS

The following will provide a clear and complete description of the technical solution in the embodiments of this disclosure, in conjunction with the accompanying drawings. Obviously, the described embodiments are only a part of the embodiments of this disclosure, not all of them. Based on the embodiments in this disclosure, all other embodiments obtained by ordinary technical personnel in this field without creative labor fall within the scope of protection of this disclosure.

Referring to FIG. 1 to FIG. 7, the multifunctional inflation pump includes a housing body 1, a lower housing 2 is fixedly connected inside the housing body 1, an air compressor core 3 is fixedly installed inside the lower housing 2, an upper housing 4 is fixedly connected to a top of the lower housing 2, a line board 5 is fixedly connected to a bottom of the upper housing 4, a protective housing 6 is fixedly connected to a top of the upper housing 4, a key 7 is fixedly connected to one side of the top of the upper housing 4 located on the protective housing 6, a keyboard frame 8 is fixedly connected to the key 7, a keyboard decorative piece 9 is fixedly connected to the keyboard frame 8, a battery assembly is provided on one side of an interior of the housing body 1 located at the lower housing 2, and a deflation assembly is provided on the other side.

Specific working principle and implementation method: the existing inflation pump according to the prior art has a relatively simple structure and a single function; when the inflation pump is used outdoors, it is necessary to connect the power supply through the power cord; when inflating equipment such as car tires, inflatable beds, and inflatable sofas outdoors, it also needs to rely on the car power supply as the power supply foundation, which causes inconvenience to users; moreover, the inflation pump can only be used for inflation, and its function is relatively single, which cannot meet the outdoor activity needs of users, resulting in low practicality of the inflation pump. Therefore, there are technical problems mentioned in the background art, and the above solution is proposed to solve the problems. This multifunctional inflation pump can provide power to the air compressor core 3 through the battery assembly set inside the housing body 1 during use, so that it inflates equipment such as car tires, inflatable beds, and inflatable sofas without the need for an external power supply, making the use of the device more convenient. Moreover, by setting a detachable battery, the battery can be easily exited as a daily mobile power source, effectively improving the practicality of the device during use. Through the deflation component set on one side of the housing body 1, the device comes with an automatic deflation function by one button during use. And the inflation pump has a real-time air pressure detection function. The inflation speed is fast, using 22 cylinders, and the inflation speed is more than twice that of similar products. It is also equipped with cigarette lighter car charging function, equipped with two 25 cm inflatable hoses, no matter which direction the inflatable hole is facing, it does not affect the inflatable pump directly on the ground to inflate, so that there is no need to squat and drag the inflatable pump with hands to inflate the tires because the inflatable hole is facing up when parking, thus making the inflatable pump more practical.

Figure 2:
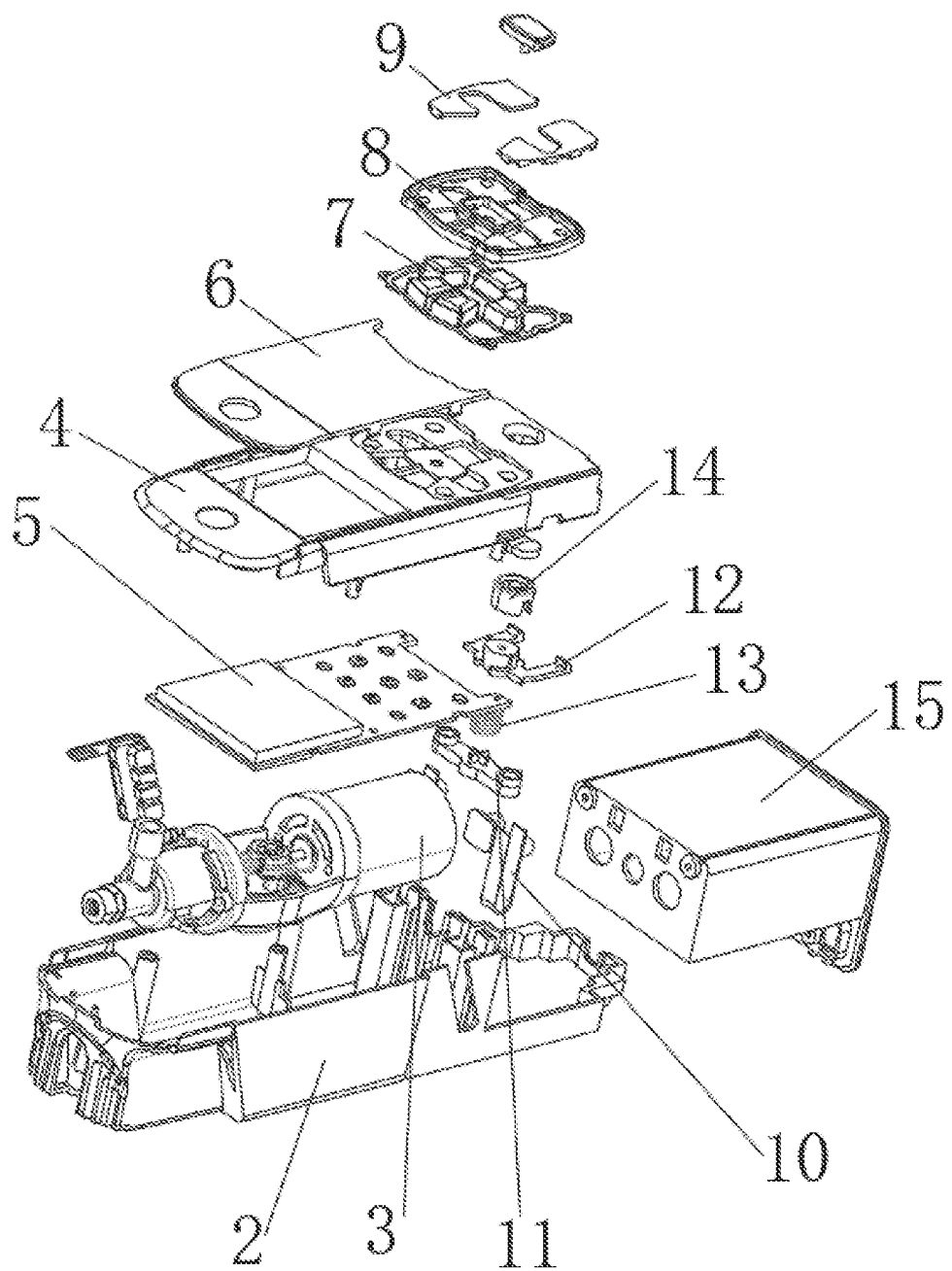
FIG. 2 is a schematic diagram of the locally enlarged explosive structure of the present disclosure.
Figure 4:
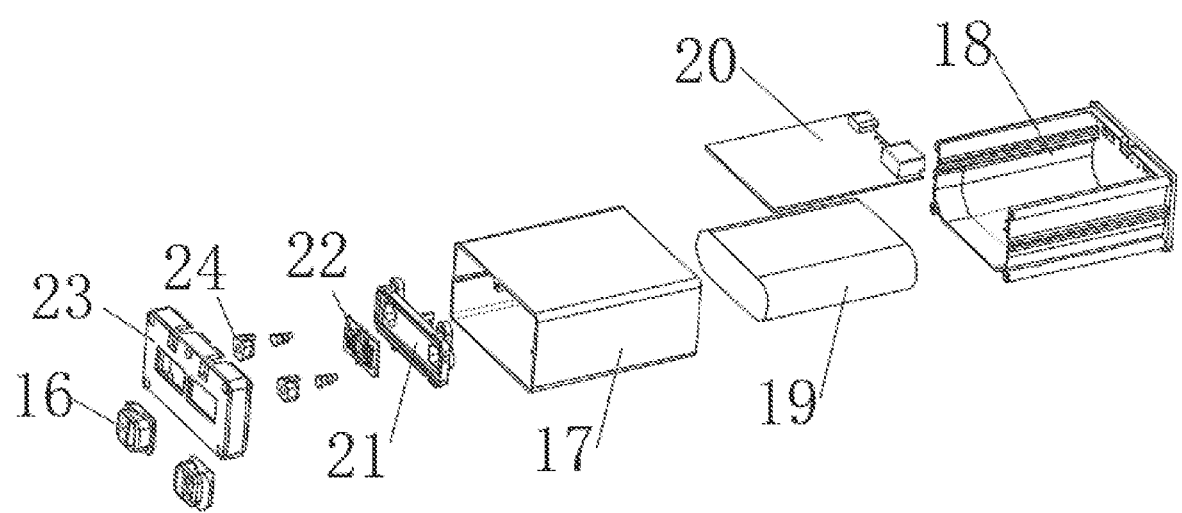
FIG. 4 is a schematic diagram of the explosive structure of the battery assembly of the present disclosure.

As shown in FIG. 2 and FIG. 4, the battery assembly includes a tail component 15 fixedly connected to the interior of the housing body 1 located at the lower housing 2, a connector 10 fixedly connected between the tail component 15 and the lower housing 2, a spring pressure piece 11 fixedly connected to a top of the connector 10, a spring 13 fixedly connected to a top of the spring pressure piece 11, a hook 12 fixedly connected to an upper end of the spring 13, a button 14 fixedly connected to a top of the hook 12, a symmetrical deflation decorative piece 16 fixedly connected to a bottom of one side of the tail component 15, a battery box 17 fixedly connected inside the tail component 15, a battery holder 18 slidably connected inside the battery box 17, a lithium battery 19 installed inside the battery holder 18, a circuit board 20 fixedly connected to a top of the battery holder 18, a battery copper pin buckle base 21 fixedly connected to one side of the battery holder 18, a protective component 22 connected to one side of the battery copper pin buckle base 21, and a battery cover 23 fixedly connected to one side of the battery holder 18. One side of the hook 12 runs through the tail component 15 and the battery cover 23, and is clamped with the battery cover 23. By pressing the button 14, the hook 12 can be pushed to move downwards such that one end of that is separated from the battery cover 23, so that the battery holder 18 can be taken out from the interior of the battery box 17, and can be used as a daily mobile power supply, thereby further improving the practicability of the inflatable pump.

Figure 3:
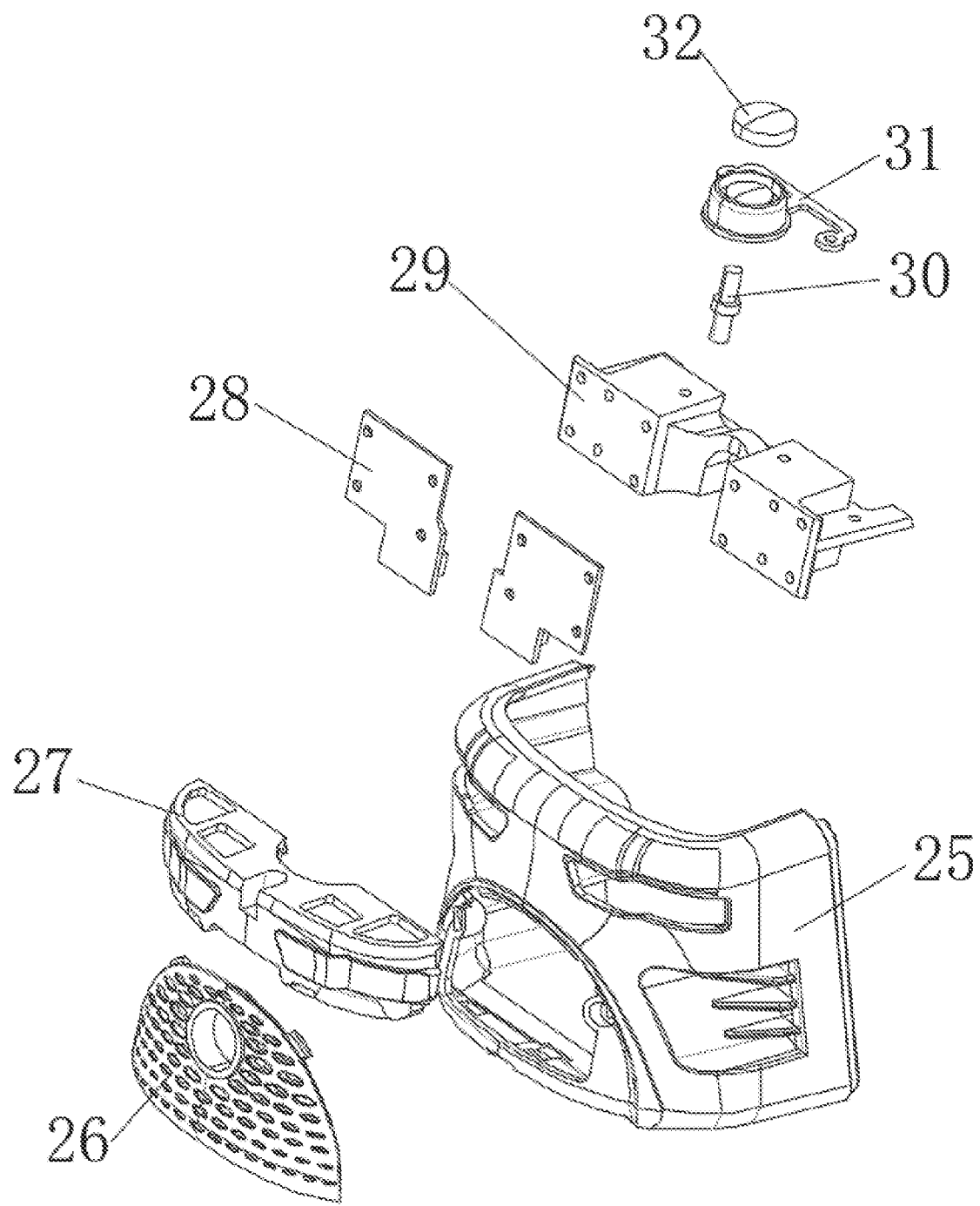
FIG. 3 is a schematic diagram of the explosive structure of the deflation assembly of the present disclosure.

As shown in FIG. 3, the deflation assembly includes a head cover 25 fixedly connected to one side of the housing body 1, an air outlet grille 26 fixedly connected to the head cover 25, a light frame 27 fixedly connected to an inner wall of the head cover 25, a light plate 28 fixedly connected to one side of the light frame 27, a heat dissipation component 29 fixedly connected to one side of the light plate 28, an insertion rod 30 fixedly connected to a top of the air compressor core 3, and a deflation button 31 fixedly connected to an upper end of the insertion rod 30. By pressing the deflation button 31, the insertion rod 30 moves downwards, so that the air compressor core 3 can deflate equipment such as car tires, inflatable beds, and inflatable sofas, thereby making the use of the equipment more convenient.

Figure 5:
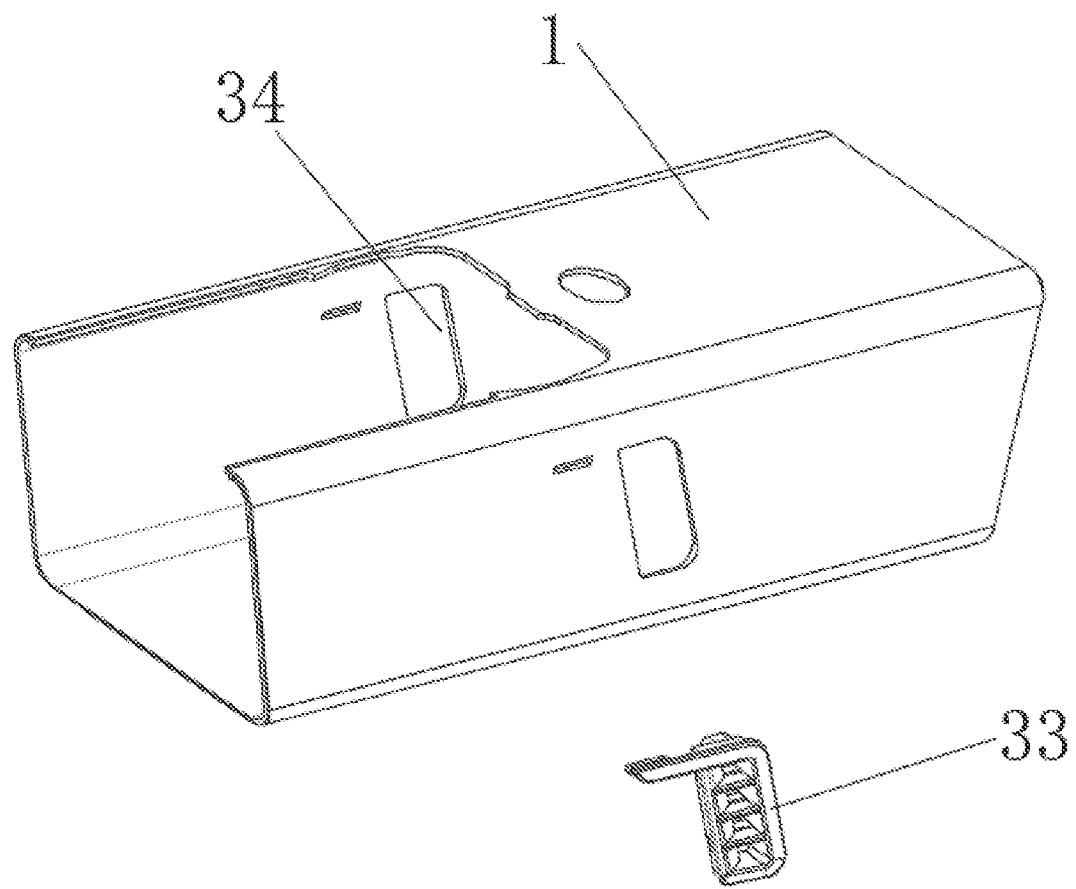
FIG. 5 is a schematic diagram of the overall three-dimensional structure of the housing body and the air intake grille of the present disclosure.
Figure 6:
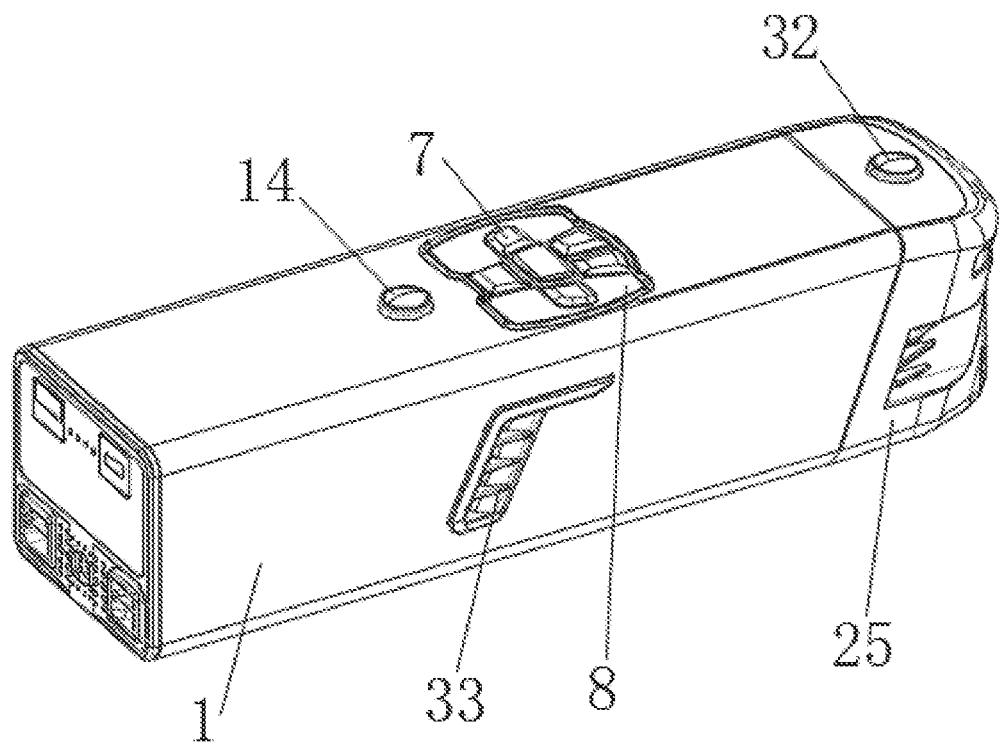
FIG. 6 is a schematic diagram of the overall three-dimensional structure of the present disclosure.
Figure 7:
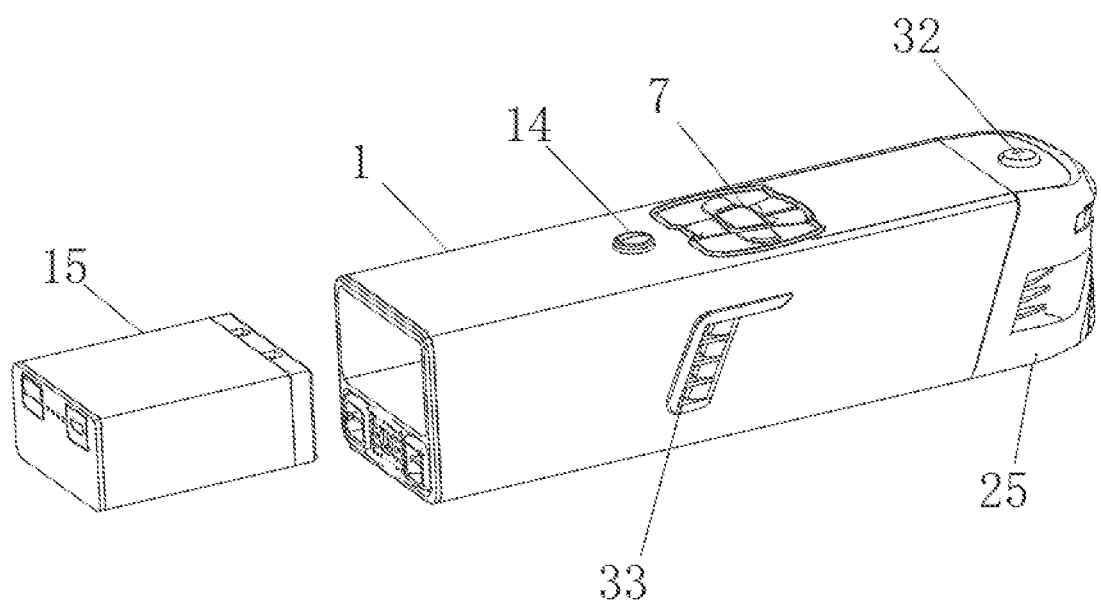
FIG. 7 is a schematic diagram of the overall three-dimensional structure of the present disclosure after removing the battery.

As shown in FIG. 5, through holes 34 are provided on both sides of the housing body 1, and an air intake grille 33 is fixedly installed inside the through hole 34. When people use this device to inflate car tires, inflatable beds, and inflatable sofas, the air intake grille 33 set on both sides of housing body 1 can effectively improve the inflation efficiency of the device, thereby making the practicality of the device higher.

As shown in FIG. 3, the top of the deflation button 31 is fixedly connected with a button patch 32. By setting the button patch 32 at the top of the deflation button 31, not only can it serve as a good identification, but it can also make people more comfortable when pressing the deflation button 31.

As shown in FIG. 4, the protective component 22 is fixedly connected to the battery copper pin buckle base 21 through a copper pin buckle 24. The advantage of this setting is that it not only makes the connection between the protective component 22 and the battery copper pin buckle base 21 more secure, but also makes it more convenient for people to disassemble and assemble the protective component 22.

As shown in FIG. 1, the lower housing 2 and the upper housing 4 are both made of ABS material. Due to the advantages of high strength and good thermal performance of ABS material, both the lower housing 2 and the upper housing 4 are made of ABS material, which can increase the strength of the device and effectively extend its service life.

The above is only preferred embodiments of the present disclosure and is not intended to limit the present disclosure. Although detailed explanations of the present disclosure have been provided with reference to the aforementioned embodiments, it is still possible for those skilled in the art to modify the technical solutions recorded in the aforementioned embodiments or to equivalently replace some of their technical features. Any modifications, equivalent replacements, improvements, etc. made within the spirit and principles of this disclosure shall be included within the scope of protection of this disclosure.

What is claimed is:

1. A multifunctional inflation pump, comprising:
    a housing body (1),
    a lower housing (2) fixedly connected inside the housing body (1),
    an air compressor core (3) fixedly installed inside the lower housing (2),
    an upper housing (4) fixedly connected to a top of the lower housing (2),
    a line board (5) fixedly connected to a bottom of the upper housing (4),
    a protective housing (6) fixedly connected to a top of the upper housing (4),
    a key (7) fixedly connected to one side of the top of the upper housing (4) located on the protective housing (6),
    a keyboard frame (8) fixedly connected to the key (7),
    a keyboard decorative piece (9) fixedly connected to the keyboard frame (8),
    a battery assembly provided on one side of an interior of the housing body (1) located at the lower housing (2), and
    a deflation assembly provided on the other side.

2. The multifunctional inflation pump of claim 1, wherein
    through holes (34) are provided on both sides of the housing body (1), and
    an air intake grille (33) is fixedly installed inside each of the through holes (34).

3. The multifunctional inflation pump of claim 1, wherein the lower housing (2) and the upper housing (4) are both made of ABS material.

4. The multifunctional inflation pump of claim 1, wherein the battery assembly comprises:
    a tail component (15) fixedly connected to the interior of the housing body (1) located at the lower housing (2),
    a connector (10) fixedly connected between the tail component (15) and the lower housing (2),
    a spring pressure piece (11) fixedly connected to a top of the connector (10),
    a spring (13) fixedly connected to a top of the spring pressure piece (11),
    a hook (12) fixedly connected to an upper end of the spring (13),
    a button (14) fixedly connected to a top of the hook (12),
    a symmetrical deflation decorative piece (16) fixedly connected to a bottom of one side of the tail component (15),
    a battery box (17) fixedly connected inside the tail component (15),
    a battery holder (18) slidably connected inside the battery box (17),
    a lithium battery (19) installed inside the battery holder (18),
    a circuit board (20) fixedly connected to a top of the battery holder (18),
    a battery copper pin buckle base (21) fixedly connected to one side of the battery holder (18),
    a protective component (22) connected to one side of the battery copper pin buckle base (21), and
    a battery cover (23) fixedly connected to the side of the battery holder (18),
    wherein one side of the hook (12) runs through the tail component (15) and the battery cover (23), and is clamped with the battery cover (23).

5. The multifunctional inflation pump of claim 4, wherein the protective component (22) is fixedly connected to the battery copper pin buckle base (21) through a copper pin buckle (24).

6. The multifunctional inflation pump of claim 1, wherein the deflation assembly comprises:
    a head cover (25) fixedly connected to one side of the housing body (1),
    an air outlet grille (26) fixedly connected to the head cover (25),
    a light frame (27) fixedly connected to an inner wall of the head cover (25),
    a light plate (28) fixedly connected to one side of the light frame (27),
    a heat dissipation component (29) fixedly connected to one side of the light plate (28),
    an insertion rod (30) fixedly connected to a top of the air compressor core (3), and
    a deflation button (31) fixedly connected to an upper end of the insertion rod (30).

7. The multifunctional inflation pump of claim 6, wherein a top of the deflation button (31) is fixedly connected with a button patch (32).

* * * * *